US006434258B2

(12) United States Patent
Wiens

(10) Patent No.: US 6,434,258 B2
(45) Date of Patent: Aug. 13, 2002

(54) USER MODIFIABLE GEOGRAPHICAL ZONES FOR THE VARIABLE APPLICATION OF SUBSTANCES THERETO

(75) Inventor: Daniel W. Wiens, Fort Morgan, CO (US)

(73) Assignee: Centrak LLC, Kersey, CO (US)

( * ) Notice: Subject to any disclaimer, the term of this patent is extended or adjusted under 35 U.S.C. 154(b) by 0 days.

(21) Appl. No.: 09/912,084

(22) Filed: Jul. 23, 2001

Related U.S. Application Data

(63) Continuation of application No. 09/504,223, filed on Feb. 15, 2000, now Pat. No. 6,266,432, which is a continuation of application No. 09/178,021, filed on Oct. 22, 1998, now Pat. No. 6,115,481.

(51) Int. Cl.[7] .................................................. G06K 9/00

(52) U.S. Cl. ........................ 382/113; 382/282; 700/240; 111/903

(58) Field of Search ................................ 382/100, 110, 382/113, 173, 180, 282; 700/239, 240; 348/120; 111/118, 129, 903; 239/69, 101; 222/41, 52

(56) References Cited

U.S. PATENT DOCUMENTS

| | | | | |
|---|---|---|---|---|
| 3,073,606 | A | 1/1963 | Hurt | 275/8 |
| 3,511,411 | A | 5/1970 | Weiss | 222/52 |
| 3,677,540 | A | 7/1972 | Weiss | 222/23 |
| 4,015,366 | A | 4/1977 | Hall, III | 47/1 R |
| 4,052,003 | A | 10/1977 | Steffen | 239/71 |
| 4,212,428 | A | 7/1980 | Walker | 239/677 |
| 4,226,366 | A | 10/1980 | Nörtoft | 239/69 |

(List continued on next page.)

FOREIGN PATENT DOCUMENTS

| | | | | |
|---|---|---|---|---|
| EP | 0 308 154 A2 | 3/1989 | | B05B/9/06 |
| WO | WO86/05353 A1 | 9/1986 | | A01D/41/12 |
| WO | WO 98/21926 A1 | 5/1998 | | A01B/79/00 |
| WO | WO 99/17245 A1 | 4/1999 | | G06F/165/00 |

OTHER PUBLICATIONS

Goering, "How Much and Where," pp. 13–15, Agricultural Engineering, Jul. 1992.

Goering, "Recycling a Concept," p. 25 (No date).

Rudolph, "Controlled Application," Dec. 1983, pp. 91–98.

Schrock, "Navigation Systems and Their Potential Applications in Agriculture," American Society of Agricultural Engineers, Paper No. MCR 85–121, Apr., 1985, pp. 1–7.

McLellan et al., "Who Needs a 20cm Precision Farming System?" 1996 IEEE Position Location and Navigation Symposium, Apr. 22–26, 1996, pp. 426–432.

Drummond et al., "Applications of Neural Networks: Precision Farming," Proc. 1998 IEEE World Congress on Computational Intelligence, May 4–9, 1998, pp. 211–215.

Esters, "VisAg Software Aids Agricultural Farmers," National Underwriter, vol. 101, No. 35, Sep. 1, 1997, p. 17.

"Agris Manual: Precision Ag AgLink"; *AGRIS Corporation and Applications Mapping*, Inc.; 1995.

*Primary Examiner*—Andrew W. Jones
(74) *Attorney, Agent, or Firm*—Sheridan Ross P.C.

(57) ABSTRACT

A method and system for applying substance formulations to a land area is disclosed. A flexible, easily modifiable graphical representation of subareas of the area is provided, wherein to each subarea it is desired to apply a combination of one or more substance formulations uniformly throughout the subarea. A user (e.g., a farmer) needs only to specify a boundary for each subarea on a graphical image of the land area for computationally defining the subarea. Subsequently, since the land area image and the subarea boundaries thereon are geographically referenced to latitude and longitude coordinates, when applying such formulations to the land area, the present invention utilizes global positioning system (GPS) signals to thereby determine when such a subarea boundary has been traversed so that a corresponding change in the applied formulation(s) can be performed.

6 Claims, 13 Drawing Sheets

U.S. PATENT DOCUMENTS 4,277,022 A 7/1981 Holdsworth et al. ........... 239/7
4,350,293 A 9/1982 Lestradet .................... 239/155
4,358,054 A 11/1982 Ehrat ......................... 239/155
4,422,562 A 12/1983 Rawson ....................... 222/55
4,456,176 A 6/1984 Agius ......................... 239/142
4,630,773 A 12/1986 Ortlip ............................ 239/1
4,714,196 A 12/1987 McEachern et al. .......... 239/62
4,878,614 A 11/1989 Hach et al. ................... 239/10
4,895,303 A 1/1990 Freyvogel .................... 239/61
5,014,914 A 5/1991 Wallenås ..................... 239/62
5,021,939 A 6/1991 Pulgiese ..................... 364/143
5,033,397 A 7/1991 Colburn, Jr. ................ 111/118
5,050,771 A 9/1991 Hanson et al. ................. 222/1
5,170,820 A 12/1992 Jones ......................... 137/899
5,184,420 A 2/1993 Papadopoulos et al. ........ 47/62
5,220,876 A 6/1993 Monson et al. ............. 111/130
5,453,924 A 9/1995 Monson et al. ............. 364/131
RE35,100 E 11/1995 Monson et al. ............. 111/130
5,566,069 A 10/1996 Clark, Jr. et al. ........... 364/420
5,684,476 A 11/1997 Anderson ................... 340/988
5,699,244 A 12/1997 Clark, Jr. et al. ........... 364/420
5,754,137 A 5/1998 Dürrstein .................... 342/357
5,771,169 A 6/1998 Wendte ...................... 364/420
5,845,229 A 12/1998 Rawlins ......................... 702/2
5,870,689 A 2/1999 Hale et al. ..................... 702/5
5,878,371 A 3/1999 Hale et al. ..................... 702/5
5,887,491 A 3/1999 Monson et al. .......... 74/864.74
5,902,343 A 5/1999 Hale et al. .................... 701/50
5,913,915 A 6/1999 McQuinn ..................... 701/50
5,919,242 A 7/1999 Greatline et al. ............. 701/50
5,931,882 A 8/1999 Fick et al. .................... 701/50
5,938,709 A 8/1999 Hale et al. .................... 701/50
5,955,973 A 9/1999 Anderson ................... 340/988
5,978,723 A 11/1999 Hale et al. .................... 701/50
5,987,383 A 11/1999 Keller et al. ................ 701/213
6,008,756 A 12/1999 Boerhave et al. ........... 342/357
6,016,713 A 1/2000 Hale ....................... 73/864.45
6,029,106 A 2/2000 Hale et al. .................... 701/50
6,070,673 A 6/2000 Wendte ......................... 172/2
6,095,254 A 8/2000 Homburg ....................... 172/6
6,115,481 A 9/2000 Wiens ........................ 382/113
6,266,432 B1 7/2001 Wiens ........................ 382/113

GET_INITIAL_MGMT_ZONES()

USER MODIFIABLE GEOGRAPHICAL ZONES FOR THE VARIABLE APPLICATION OF SUBSTANCES THERETO

CROSS REFERENCE TO RELATED APPLICATION

The present application is a continuation of U.S. patent application Ser. No. 09/504,223, filed Feb. 15, 2000, entitled "USER MODIFIABLE LAND MANAGEMENT ZONES FOR THE VARIABLE APPLICATION OF SUBSTANCES THERETO," now U.S. Pat. No. 6,266,432, which is a continuation of U.S. patent application Ser. No. 09/178,021, filed Oct. 22, 1998, entitled "USER MODIFIABLE LAND MANAGEMENT ZONES FOR THE VARIABLE APPLICATION OF SUBSTANCES THERETO," now U.S. Pat. No. 6,115,481, which is incorporated herein by this reference.

FIELD OF THE INVENTION

The present invention relates to a system and method for applying substance formulations to a land area, and in particular, to a system and method for computationally determining land management zones within the land area, wherein each land management zone may require a substance formulation specific to the zone.

BACKGROUND OF THE INVENTION

There have been various application systems for applying substances to geographical areas such as farmland, forests, etc. In some application systems, the application of formulations of such substances as fertilizers, pesticides, seed and land inputs is determined according to location within the geographic area. That is, the formulations and/or application rates thereof are determined according to the location of an applicator (e.g., a dispensing vehicle) as it moves through the geographic area.

Such application systems may include computer subsystems used for variably applying various substances to the geographic area. Heretofore, however, application systems for variably applying substances have not been designed to utilize a user's experiential knowledge regarding the geographic area. For example, a user such as a farmer may have substantial experiential knowledge regarding the effectiveness of applying substances to his/her farmland. Further, the farmer may have certain personal preferences (e.g., farming strategies) that he/she desires to implement regarding the application of substances. However, such personal knowledge and/or preferences are not easily incorporated into such computer subsystems for thereby modifying how such substances (and formulations thereof) are applied to the farmer's land. In fact, to incorporate such personal knowledge and/or preferences into the computer subsystems may require the user to perform one or more of the following tasks:

(a) enter fallacious soil sample assay data into the computer subsystem together with associated latitude and longitude coordinates for "tricking" the computer subsystem into assigning a desired substance formulation to a particular subarea of the geographic area;

(b) specifying, at each pixel of an electronic map of the geographic area, the desired substance formulation(s) to apply; and (c) individually identify each pixel used in representing a subarea of the geographic area that is to have the desired same formulation(s) applied thereto.

Moreover, such computer subsystems are not, in general, capable of incorporating the user's personal knowledge and/or preferences while the user is, for example, inspecting the geographic area to which the one or more substances are to be applied. Thus, during such an inspection, if the user comes across a subarea to which he/she desires to apply a different formulation, then he/she will likely be required to make note of locations defining the subarea and then return to the site having the computer subsystem and enter his/her modifications via one or more of the above tasks (a)–(c). Accordingly, such computer subsystems are batch-like in their processing in that the user is likely to collect a list of changes before commencing to enter them into the computer subsystem.

If, however, it would be desirable to have an application system that allowed a user to easily input personal knowledge and/or preferences related to the application of substances to a geographic area. Moreover, it would also be desirable that each change related to how substances are applied could be entered as each location where the change is to apply is encountered.

SUMMARY OF THE INVENTION

The present invention is a method and system for applying formulations of substances to a land area. In particular, the present invention includes a computational system for determining which (and/or an amount) of one or more formulations of substances are to be distributed on various subareas of the land area. That is, for each subarea (hereinafter also denoted a "management zone"), there is a uniform application of a particular combination of one or more formulations throughout the management zone. More particularly, the computational system of the present invention provides:

(a) a graphical display of the land area, wherein this graphical display is an enhanced version of a pictorial image of the land area such that salient features of the land area are emphasized. For example, when the image is from reflectance-of visible light, various shades of brown and/or green may be transformed into easily distinguished colors such as blue and orange; and (b) a novel capability for graphically modifying how the substance formulations are applied to the management zones of the land area. In particular, a user may perform such application modifications by creating, modifying and deleting graphical representations of one or more management zones and these graphical changes are provided using user interaction techniques where boundaries of the management zones (and changes thereto) are input for defining (and modifying) the management zones.

Accordingly, referring to (a) above, the present invention allows for an aerial image of the land area to be adjusted from an angled view of this area to a view that appears to be from directly overhead the area. Additionally, note that the present invention may use one or more images, singly or combined, wherein, e.g., the images may be obtained from visible light reflectance and/or absorption, infrared light reflectance and/or absorption, multi- and hyperspectral light reflectance and/or absorption, plus any kind and type of themed nutrient plans, yield maps, and other remotely sensed data, as well as themed derived maps using any or all of the above types of image data.

Referring to (b) above, the present invention allows a user to define management zone boundaries in terms of computational geometry data objects such as lines, splines, arcs and other geometric entities that are of a higher dimension than that of a point (i.e., pixel). Thus, a user can create and/or modify a management zone without manually having to identify each point of the management zone or its boundary.

Furthermore, it is an aspect of the present that global positioning system (GPS) signals may be used for graphically tracking (e.g., on a computer display of a portable management subsystem included in the present invention) a representation of a vehicle traversing the land area. Accordingly, such a management subsystem may be used for tracking a vehicle while applying one or more of the formulations of substances to the land area. Note, however, that it is an aspect of the management subsystem that it may receive GPS signals while traversing the land area so that accurate management subsystem locations within the land area may be periodically determined. Moreover, note that since the graphical representation of the land area and its corresponding management zones are correlated with latitude and longitude coordinates, the portable management subsystem is capable of being used in the land area of application for determining when a management zone boundary is crossed for-thereby changing the application of one or more of the substance formulations (or amounts thereof) that are being applied to the land area.

Additional features and benefits of the present invention will become evident from the Detailed Description and the accompanying drawings.

DETAILED DESCRIPTION

Figure 1:
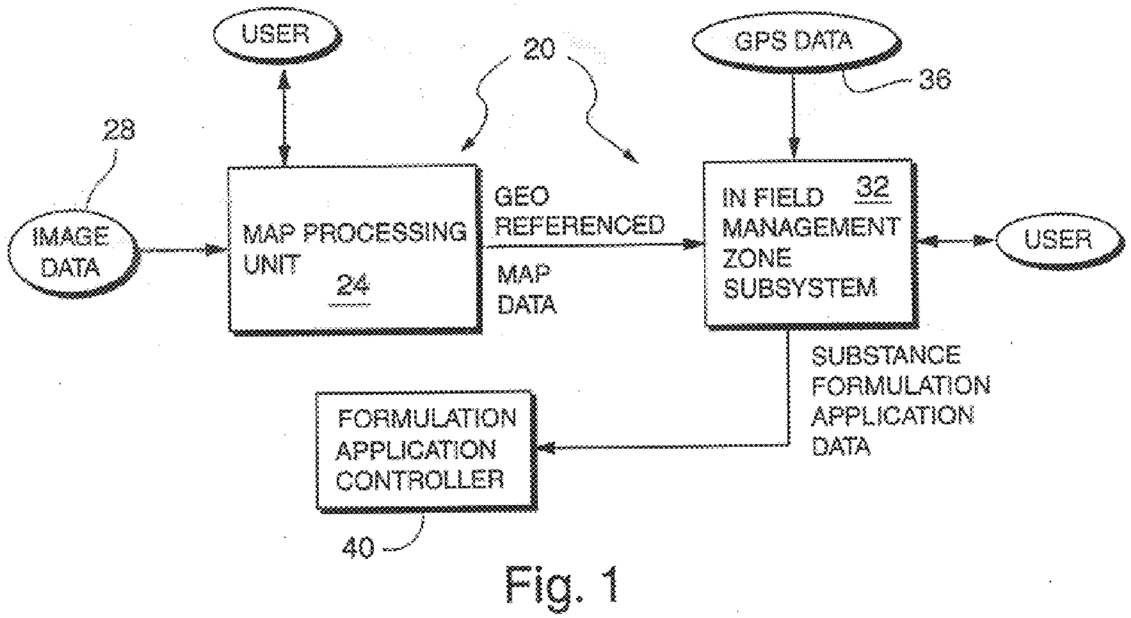
FIG. 1 shows a block diagram illustrating the components of the land management system 20 and its interactions with a user(s) and other devices.

FIG. 1 shows a block diagram of the land management system 20 of the present invention. Included within the land management system 20 is a map processing unit 24 for processing digital photo image data 28 according to instructions by a user interacting with the map processing unit. In particular, the map processing unit 24 provides the user with the ability to digitally adjust the perspective of a photo image resulting from the display of the photo image data 28. That is, the photo image or a desired portion thereof, is transformed to obtain a view from substantially directly overhead. Further, the map processing unit 24 allows a user to geographically reference the photo image by identifying a latitude/longitude pair with each of a small number of pixels on the photo image so that subsequently all other pixels on the photo image may be automatically identified with a corresponding latitude/longitude pair. Note that the processing of the map processing unit 24 will be described in more detail hereinbelow.

Additionally, the land management system 20 also includes a user editable management zone subsystem 32 (hereinafter also abbreviated as management zone subsystem). Upon receiving geographically referenced photo image data from the map processing unit 24 (wherein this image data provides sufficient information so that substantially all pixels of the map may be geographically referenced with, for example, a latitude and longitude), a user may perform one or more of the following tasks using the management zone subsystem 32:

(1.1) Display the geographically referenced image data on a computational display device.

(1.2) Define subareas of an area on the map such that each subarea becomes a "management zone" that is managed substantially as a homogenous subarea of the larger area being managed.

(1.3) Modify one or more management zones that have previously been defined. In particular, user interaction techniques are provided for modifying management zone boundaries, or some other user interaction technique, wherein the user need not explicitly enter a management zone identification for substantially every image pixel of an area assigned to a different management zone.

(1.4) Delete a management zone(s) and thereby either coalesce the deleted management zone area into another management zone selected by the user, or coalesce the area of the deleted management zone into a predetermined management zone that acts as a default management zone.

(1.5) Using the GPS data 36, obtained via signals from global positioning system (GPS) satellites, display on a graphical image of the area, the current location of the user (more precisely, the current location of a GPS receiver operably connected to the management zone subsystem 32) when the user is in the area being managed.

(1.6) Again using the GPS data 36, determine a management zone within which the user (more precisely the GPS receiver) is currently located so that a particular substance formulation for application to the management zone can be determined and output to a formulation application controller 40 for thereby dispensing the substance formulation onto the management zone.

Figure 2:
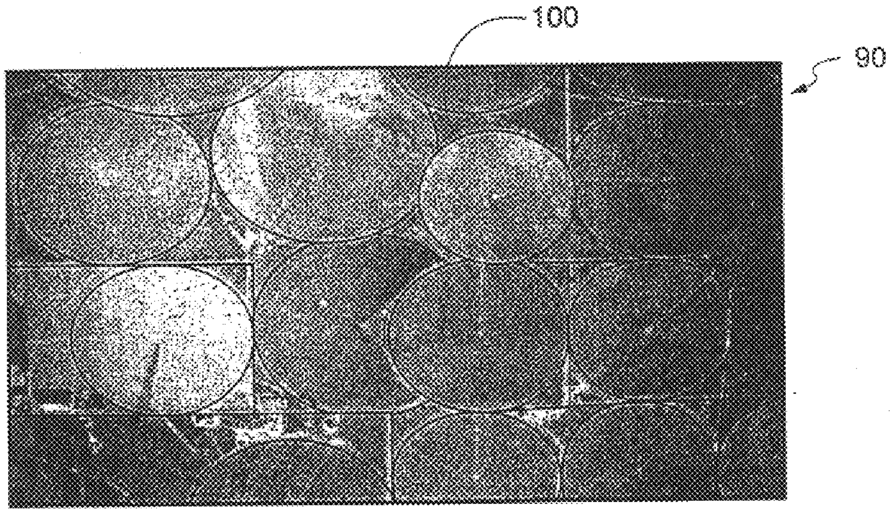
FIG. 2 is an illustration of an aerial photo 90 of an agricultural area having an area 100 to which the present invention can be applied.

Prior to describing the detailed processing steps performed by the land management system 20, illustrations of various display outputs provided by the present invention are described in reference to FIGS. 2 through 7. In particular, FIG. 2 illustrates an aerial digital photo image 90 (derived from image data 28) of an area having circular agricultural fields therein, wherein the circular area 100 is an area that is desired to be processed according to the present invention. Note that the image of FIG. 2 may not be from a perspective of directly overhead the area 100 and therefore may appear skewed.

Figure 3:
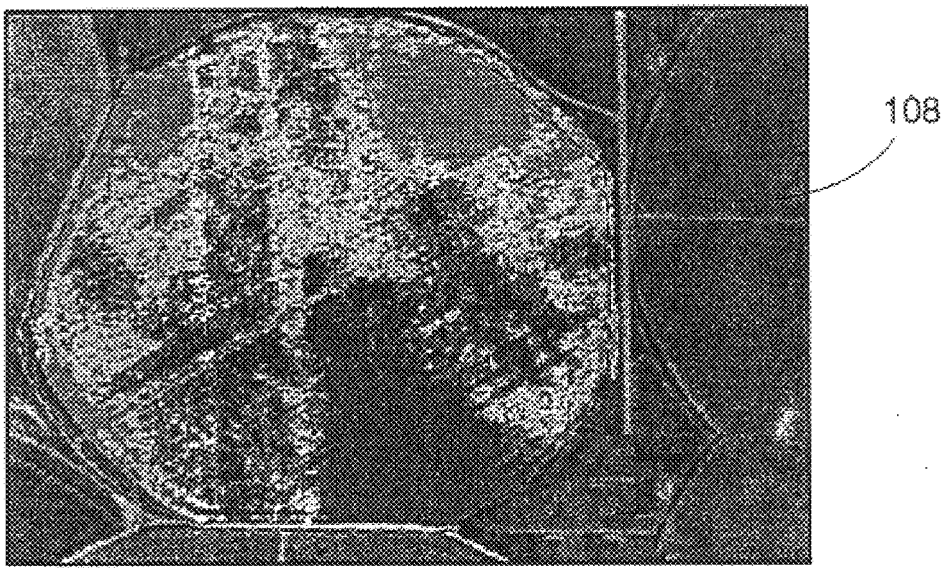
FIG. 3 is an enlarged view of the area 100.
Figure 4:
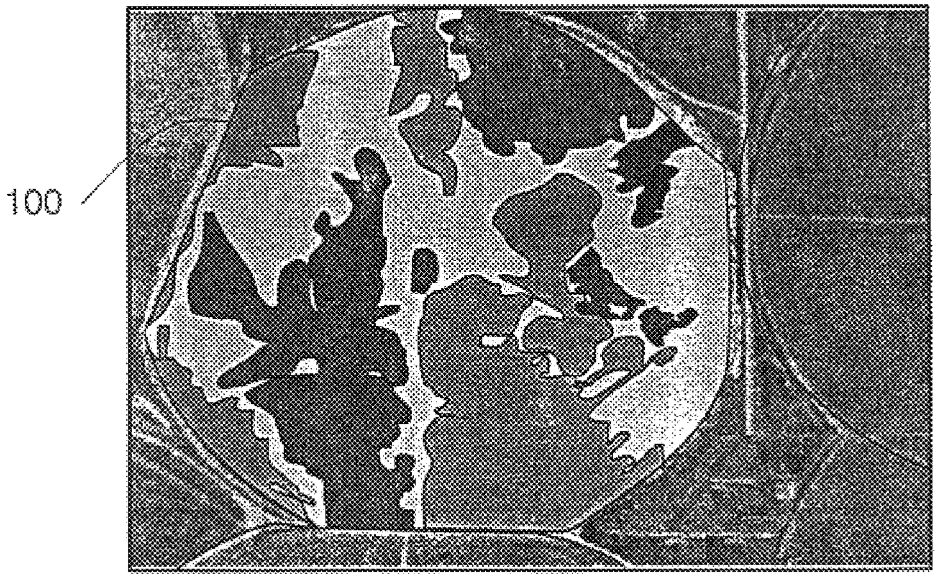
FIG. 4 illustrates the results of applying a color contrast enhancement process of the present invention to area 100.

Once the map processing unit 24 has received the image data 28 for thereby displaying the image 90, the user is able to zoom in on the area 100 and identify it by inputting a boundary about the area. For example, FIG. 3 is an illustration of a display provided by the map processing unit 24 which shows the area 100 on a larger scale, and wherein the user has identified and displayed a dashed boundary 108 about the area 100. Subsequently, as shown in FIG. 4, the user is able to use the map processing unit 24 to enhance the distinctions between various subareas of the area 100. In particular, color differences displayed on FIG. 3 may be enhanced to thereby obtain the illustration of FIG. 4. Note that such enhancements may be performed in any one of a number of ways. For example, the following techniques may be used:

(2.1) Select color bands or combinations thereof to display desired properties, e.g., such properties may include: shades of green; NOVI (a red and infrared combination indicating vegetation); shades of red indicating soil brightness; and shades of infrared indicating crop stress;

(2.2) Accomplish histogram stretch of pixels of selected areas to contrast color differences;

(2.3) Divide pixels into two bins or categories;

(2.4) Apply a filter to cluster substantially similar pixels into similarly identified subareas, wherein substantially similar pixels are determined, via one or more filters such as e.g., median, Weiner, or Sobel filters; and (2.5) Color code the pixels in each of the bins or categories.

Figure 5:
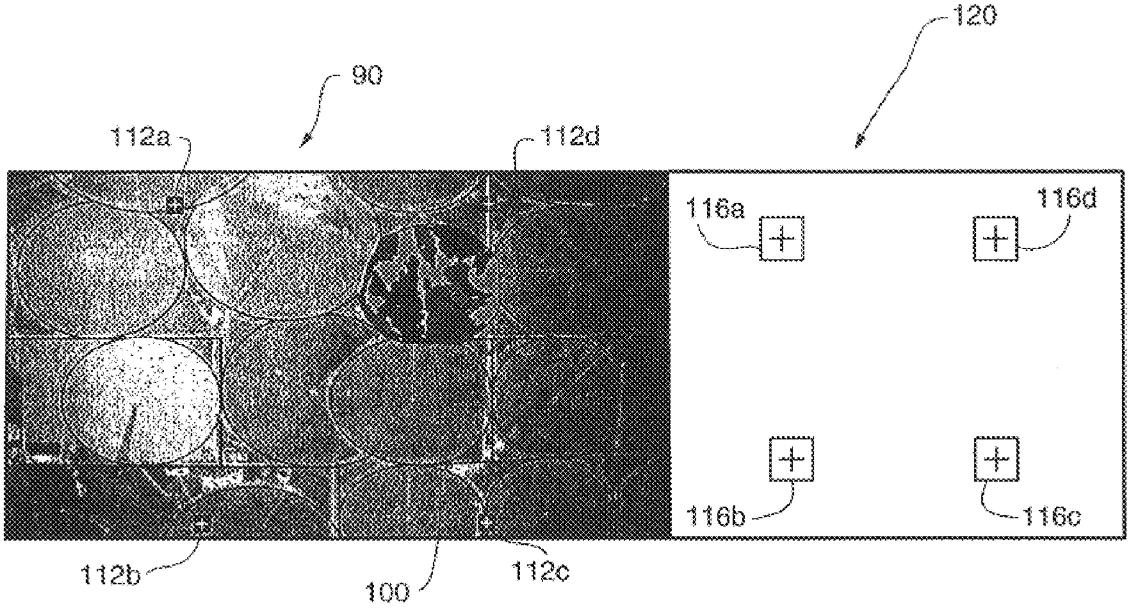
FIG. 5 shows a computer display with each point 112*a* through 112*d* in the left portion of the display (i.e., on photo image 90) to be identified with a corresponding point 116*a* through 116*d* on the right portion of the display, wherein each point 116 has a corresponding latitude and longitude associated therewith. By identifying corresponding points 112 and 116, the image 90 can be geo-referenced wherein each pixel of the photo image 90 is then able to be identified by a latitude/longitude pair.

Subsequently, in FIG. 5, the user may identify locations on the image 90 with known latitude and longitude coordinates. For example, the user may select points (i.e., pixels) 112*a* through 112*d* and associate each one of these points with a latitude and longitude for identifying the location of the point. Note that the latitude and longitude data may be provided either with the map data 28 and/or from another source. In FIG. 5, the geographic reference points 116*a* through 116*d* having the latitude and longitude data associated therewith are displayed in their relative orientations to one another in an adjacent window 120 so that the user can more easily identify a point on image 90 with a corresponding point 116 in window 120. Accordingly, such a display assists the user in properly identifying latitude and longitude coordinates with particular pixels on the image 90. In one embodiment of this user interaction technique, the points 116 in window 120 are iteratively highlighted and the user is requested to identify the corresponding location on the image 90 to which the latitude and longitude coordinates of the highlighted point 116 corresponds.

Figure 6:
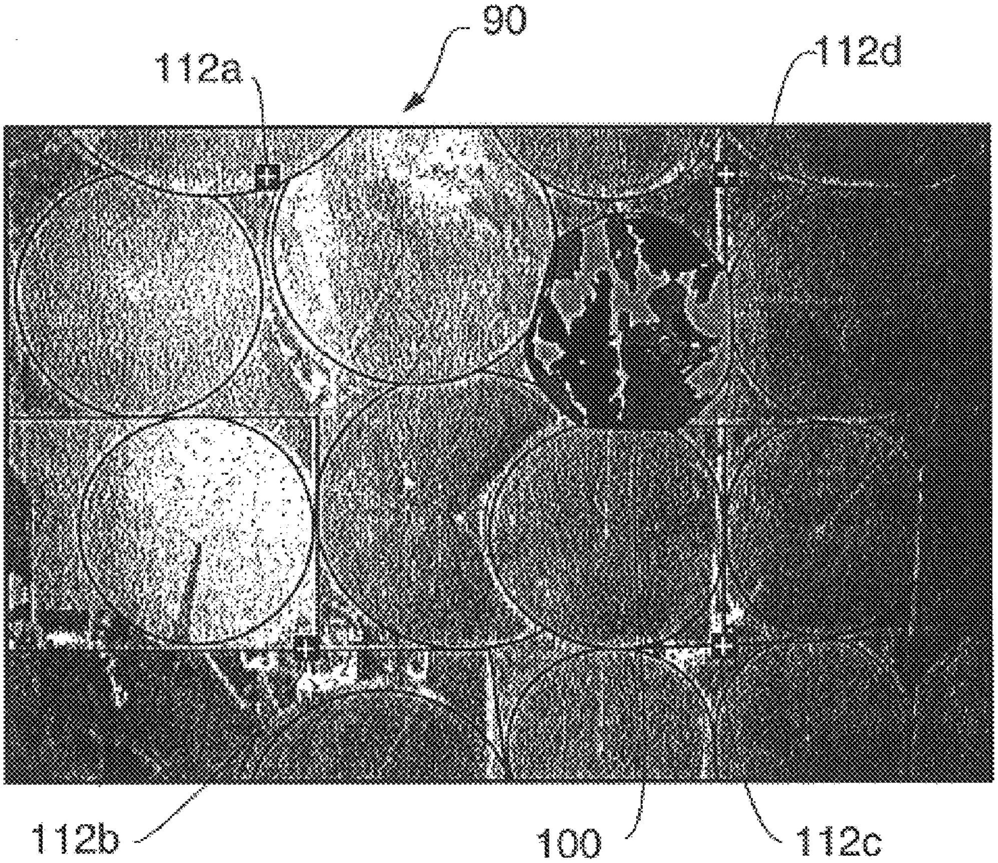
FIG. 6 shows a transformed version of the photo image 90, wherein the image is adjusted so that any viewing angle (other than from directly overhead) from which the image 90 was obtained is transformed into a directly overhead (i.e., perpendicular) perspective. Note that this can be performed once the image 90 is geographically referenced.

Once the geographic referencing data is associated with the image 90 (at, for example, points 112), the image 90 (and/or the area 100) is able to be displayed as if viewed from directly overhead as shown in FIG. 6.

Figure 7:
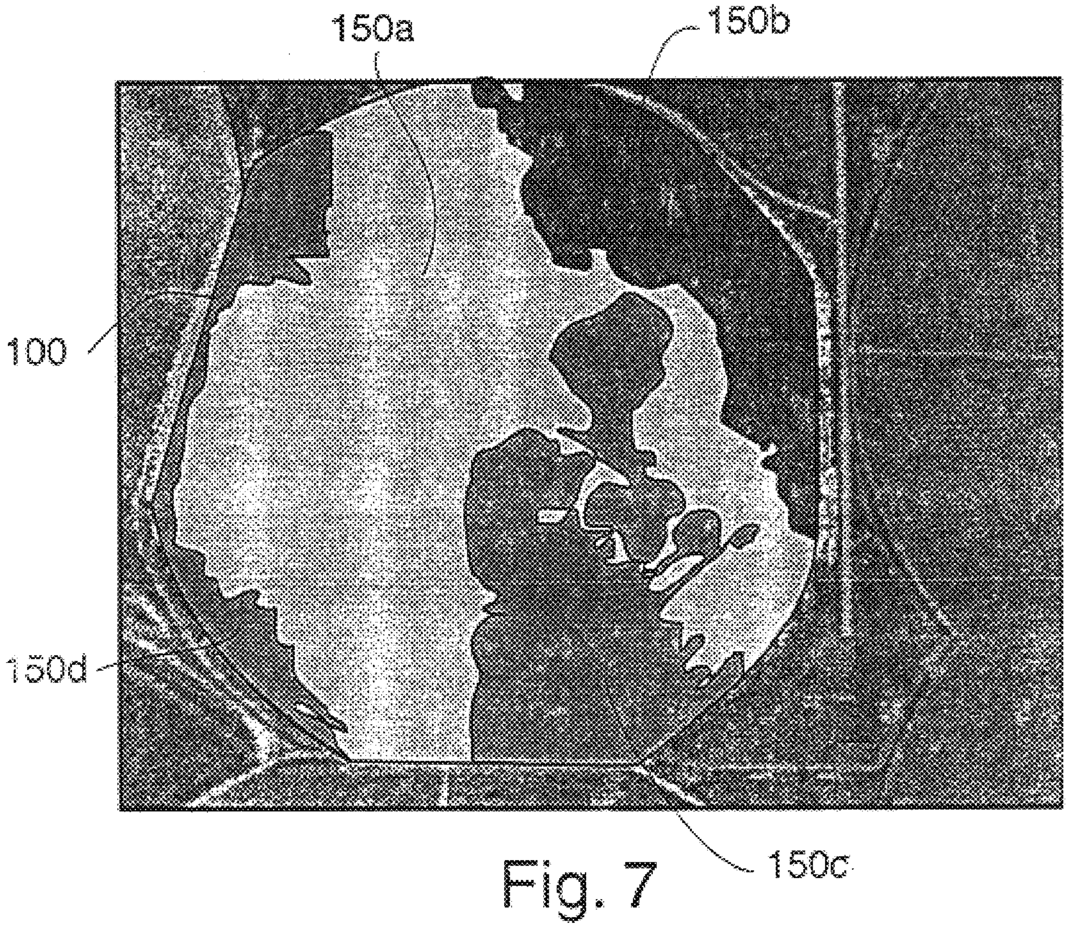
FIG. 7 shows a computer display generated by the present invention wherein land subarea management zones 150*a* through 150*d* are defined by the management zone boundaries 160.

Subsequently, the image data 28 used in the display of FIG. 6 is provided to the management zone subsystem 32 for further processing according to the functions itemized above in (1.1) through (1.6). FIG. 7 shows a map of the area 100 as displayed by the management zone subsystem 32, wherein the land area distinctions within the area 100 have been enhanced, and additionally, the user has inserted boundary curves for partitioning the area 100 into subareas (also denoted management zones) 150*a*, 150*b*, 150*c*, and 150*d*. Note that in one embodiment for displaying such partitions of the area 100, a graphical layering technique is used wherein the boundary curves are provided on a graphical layer separate from the graphical layer used in displaying the image of area 100, as one skilled in the art will understand.

Additionally, note that once management zones 150 have been defined, the management zone subsystem 20 provides the user with the ability to assign data descriptors to each of the management zones 150*a* through 150*d*. In particular, for each management zone 150, its corresponding data descriptor may have a management zone identification number, a textual description of the management zone (e.g. a description of soil type being light, medium, or dark), a factor indicative of the relative proportion to which a substance formulation is to be applied to the management zone, a proposed application rate (e.g. gallons per acre), an actual application rate (once the formulation has been applied to the management zone), and a measurement of the total area of the management zone (e.g. in acres). Moreover, additional attributes can also be associated with each management zone. In particular, such attributes as visible light reflectance and/or absorption, infrared light reflectance and/or absorption, multi and hyper spectral light reflectance and/or absorption, plus any kind and type of themed nutrient plans, yield maps and other remotely sensed data, as well as themed derived maps using any or all of the above types of data in combination.

Figure 8:
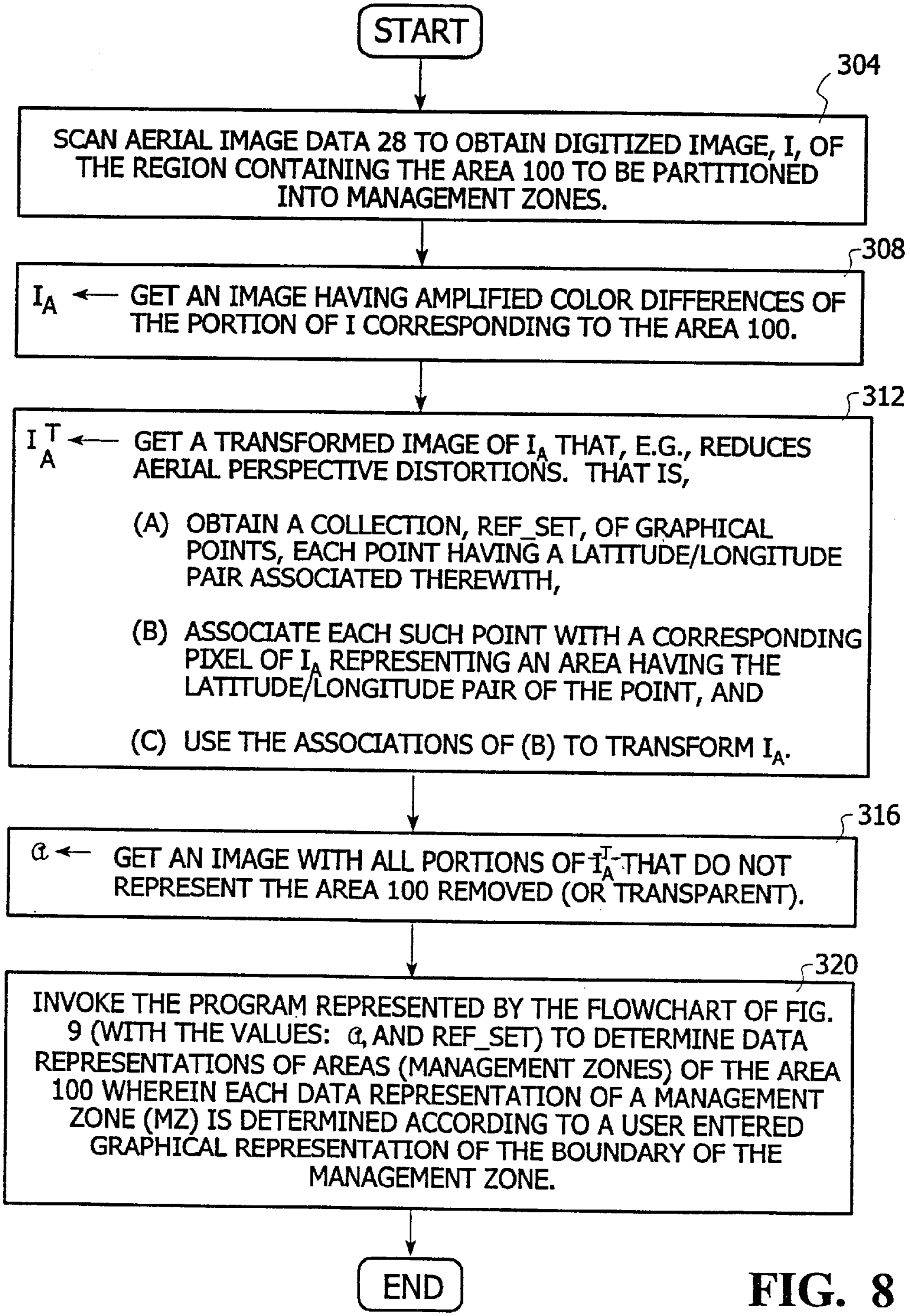
FIG. 8 is a flowchart indicating the high level steps performed for constructing the initial collection of management zone data representations.
Figure 9:
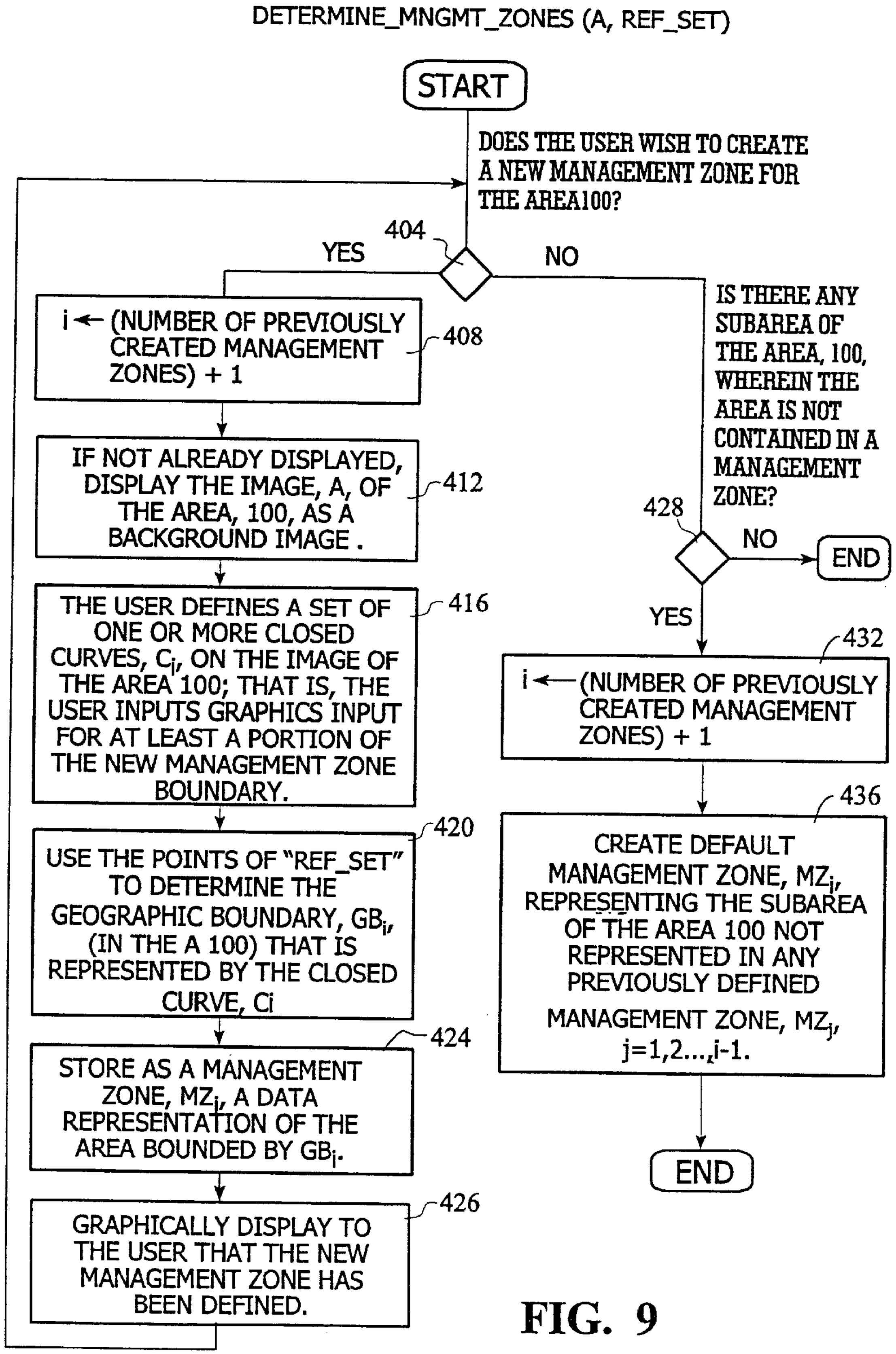
FIG. 9 is a flowchart describing how a user manually enters data for representing boundaries of management zones when, e.g., constructing the initial collection of management zones as per FIG. 8

FIG. 8 is a flowchart for the program performed by the map processing unit 24 illustrating the steps performed for constructing the initial collection of data for an area such as area 100. Assuming the image data 28 includes a photo image of a region containing the area 100, in step 304 this image data is scanned to obtain a digital image, I, of the area 100 to be partitioned into management zones. Subsequently, in step 308, the digitized image I is enhanced so that color differences are amplified for the area 100, thus obtaining $I_A$ as image data that may be displayed as in FIG. 4. In step 312, the amplified color image $I_A$ of area 100 is transformed to reduce aerial perspective distortions as discussed with regard to FIGS. 5 and 6 hereinabove. As a first substep of step 312, a plurality of known locations (collectively denoted, REF_SET) of the image $I_A$ have their latitude/longitude pairs associated therewith. Subsequently, $I_A$ is transformed to reduce aerial perspective distortions, wherein the result, $I_A^T$, is a directly overhead image of the area shown in $I_A^T$. Note that each pixel of $I_A$ may have its latitude and longitude computed in this step; however, this is not required. Subsequently, in step 316, the variable, $\alpha$, is assigned (access to) the enhanced and transformed image $I_A^T$ that has been modified to remove or render transparent all portions thereof except for that of area 100. Finally, in step 320, the program corresponding to the flowchart of FIG. 9 is invoked to determine the management zones of the area 100. Note that at least some activations of step 320 may occur in the map processing unit 24. However, the processing of this step is provided by the management zone subsystem 32, and can be initiated manually by the user once the set, REF_SET, of geographic reference points and the image, $\alpha$, is determined.

Referring to FIG. 9, this flowchart provides the high level steps for determining management zones when provided with the image, $\alpha$, and the collection, REF_SET, of geographic reference points, wherein the geographic reference points represent geographical reference locations that: (a) have associated latitude and longitude coordinates for the locations, and (b) can be used for determining a latitude and longitude of any pixel of $\alpha$. Accordingly, beginning with decision step 404, a determination is made as to whether the user wishes to create a new management zone for the area of image $\alpha$. Note that at least in one embodiment wherein the present invention is provided on a personal computer having a windows operating system such as WINDOWS95®, this step may be easily provided as a menu choice on a pull-down menu. Assuming the user wishes to create a new management zone, in step 408, the identifier, i, is incremented so that it denotes the number of previously created management zones plus 1 (which, in an initial performance, implies that i is equal to 1). Subsequently, in step 412, the image $\alpha$ is displayed (on a computer display) as a background bit map image. In step 416, the user defines a set, $C_i$, of one or more closed curves on the image $\alpha$, wherein the set $C_i$ represents a boundary for the new management zone to be created. Note that in one embodiment, the portion of the set $C_i$ entered by the user is displayed on a different graphical layer from that of the image $\alpha$. Moreover, the user need not provide the boundary portions of the newly desired management zone that is coincident with the perimeter of the area 100. That is, in one embodiment of the present invention, it detects when a user defined portion of the new management zone boundary is sufficiently close to a portion of the perimeter of the area 100 so as to automatically include such a portion of the perimeter as part of a desired closed curve used in defining the boundary of the new management zone. In particular, the user can specify that the user defined portion of a management zone boundary "snap to" the perimeter of area 100 when the two are within a predetermined graphical distance from one another. Further, note that it is straightforward to determine the portion of the perimeter of image $\alpha$ to use in completing a boundary of a new management zone in that, for example, the user can be requested to specify a point within the newly desired management zone, as one skilled in the art will understand. Further, note that in creating a new management zone, one or more other previously created management zones may have to be modified in that the newly created management zone may be formed from areas initially residing in one or more of the previously created management zones. Thus, the present step 416 may also include substeps for determining if there is an intersection between the proposed newly created management zone and previous management zones so that such intersection areas can be deleted from previously created management zones.

In step 420, the present embodiment of the invention utilizes the set of geographic reference points, REF_SET, for determining a geographic representation, $GB_i$, of the boundary of the new management zone corresponding to the set $C_i$. In particular, the geographic (i.e., latitude and longitude) values of at least some pixels of $C_i$ may be included in $CB_i$. Accordingly, these geographic values may be determined by preassigning to each pixel of the image $\alpha$ a corresponding latitude and longitude, as one skilled in the art will understand. In one embodiment, $GB_i$ includes each pixel residing on each closed curve of the set $C_i$, and for each such pixel, a corresponding geographic latitude and longitude position for the subarea represented by the pixel. In another embodiment, $GB_i$ may be defined in terms of computational geometry entities such as a series of one or more lines, arcs, splines, etc., wherein the coordinates used in defining these entities have latitude and longitude pairs associated therewith. Thus, although the latitude/longitude pair for each boundary pixel may not be stored, all such pairs can be computed when desired. Accordingly, by computationally associating with each management zone, $MZ_i$, a geographic representation, $BG_i$, of the boundary for $MZ_i$, a straightforward determination can be made about the positional relationships between locations in the area 100 and the boundaries of the management zones. Alternatively in another embodiment of the present invention, the step 420 may be unnecessary in that the set of closed curves $C_i$ may be stored as a set of graphical objects positioned in a graphical coordinate system. Accordingly, in order to determine whether a location, L, in the area 100 is inside or outside of the boundary of a management zone, $MZ_i$, the location L is converted into a graphical position, $P_L$, of the graphical coordinate system, and subsequently a determination is made as to whether $P_L$ is interior to the set $C_i$ of boundary curves. In any of the above embodiments, note that one skilled in the art will also understand how to determine when an object being tracked in the area 100 crosses a boundary of a management zone.

Subsequently, in step 424, a data representation of the new management zone, $MZ_i$, is stored for subsequent access when, for example, an application of one or more substance formulations are being applied to the area 100. In particular, the representation $GB_i$ (or another representation of the closed management zone boundary curve(s)) is stored. Note that the data representation of the management zone $MZ_i$ may include both a representation of the pixels in the image $\alpha$ residing within the management zone, and/or an identification of the boundary surrounding the management zone.

Referring once again to step 404, if the user does not wish to create a new management zone, then decision step 428 is encountered wherein a determination is made as to whether there is any remaining area of the area 100 that is not contained in a management zone. Accordingly, if such a subarea remains outside of all currently defined management zones, then in step 432 the variable i is incremented to reflect the number of management zones plus 1, and in step 436 a default management zone, $MZ_i$, representing the subarea not included in any previously defined management zone is defined. Note that this default management zone may be different from previously defined management zones in that there may be more than one subarea contained within this default management zone, wherein the subareas are not connected to one another. Accordingly, this management zone may include descriptions of each of the subareas that are mutually disconnected from other such subareas within the default management zone. Thus, a representation similar to a non-default management zone may be provided for each of the subareas of the default management zone that are mutually disconnected from the other subareas of the default management zone. Subsequently following step 436, the flowchart of FIG. 9 ends. Alternatively, in referring again to step 428, if there are no further subareas outside of the defined management zones, then the flowchart also ends.

Figure 10A:
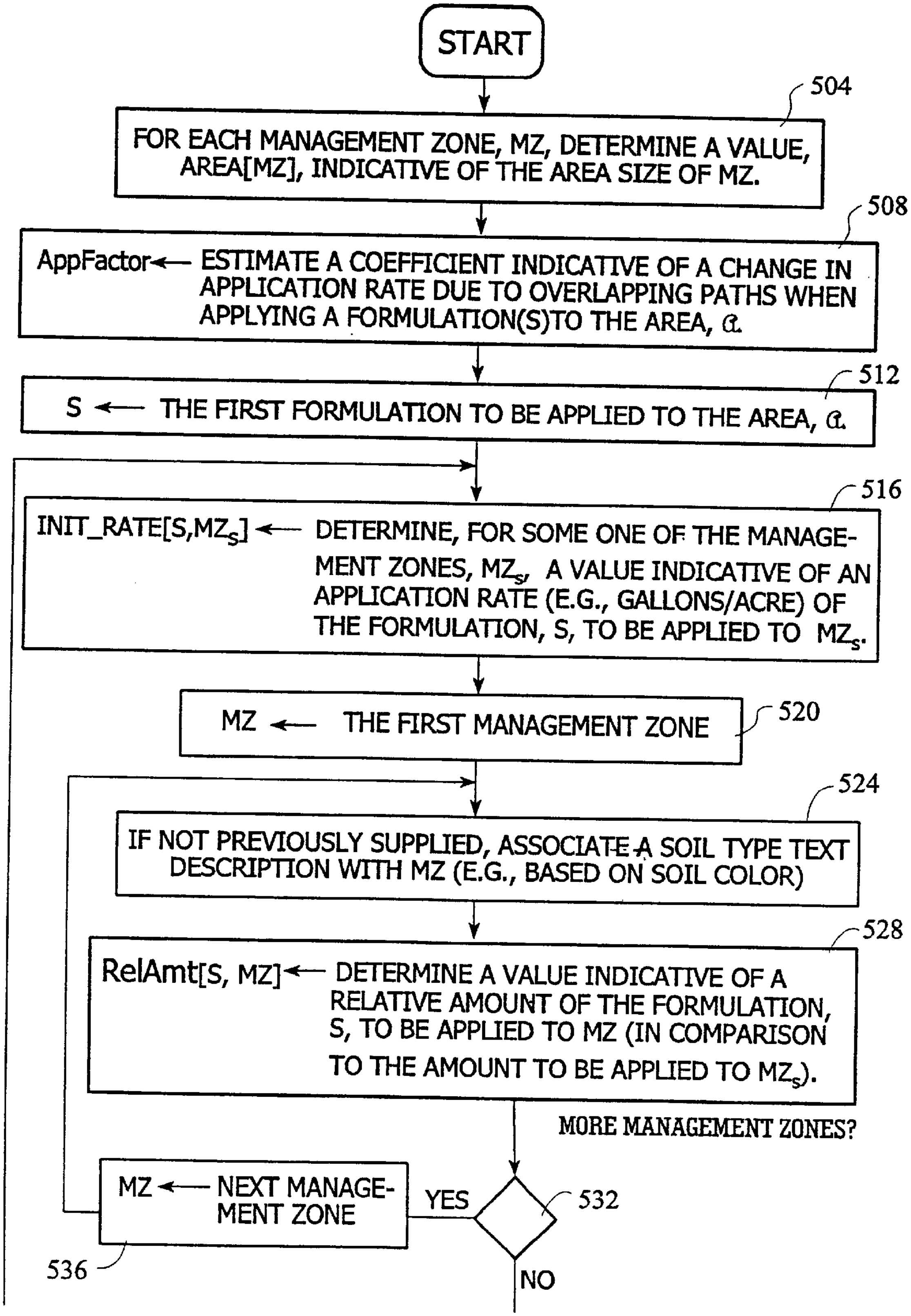
FIGS. 10A and 10B illustrate a flowchart for determining the amount of each formulation of one or more substances to be applied to the management zones of an area such as an agricultural field.
Figure 10B:
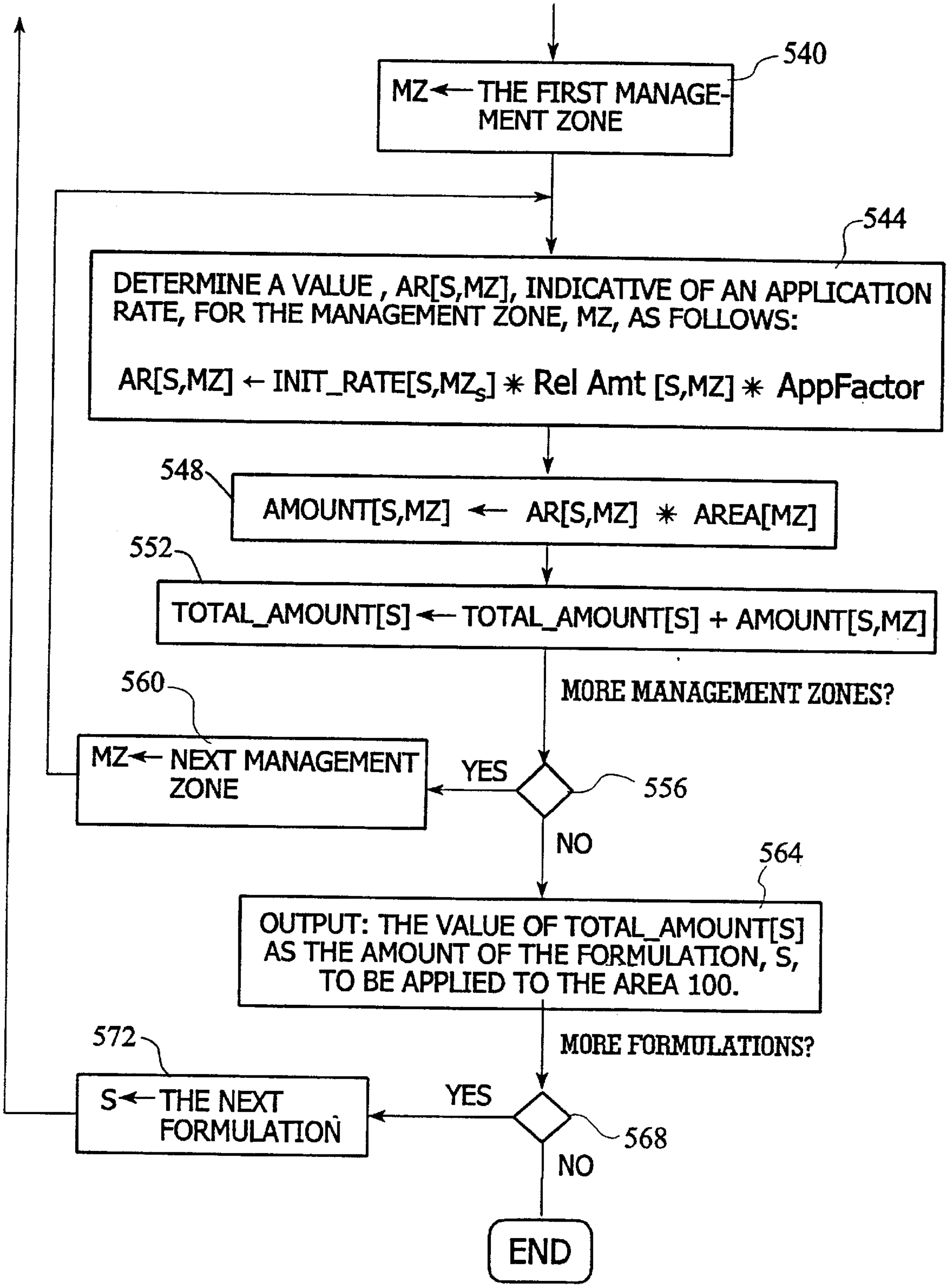

FIGS. 10A and 10B show the processing performed for determining the total amounts of various formulations of substances to be applied to the area 100. In particular, the flowchart of FIGS. 10A and 10B show the processing performed to determine the amount of each substance formulation to be applied to each management zone. Accordingly, in step 504, a value, AREA[MZ], is determined for each management zone MZ, wherein AREA[MZ] is indicative of the size of the management zone. Such values may be in terms of acres, square feet, square miles, square meters or other measurements of area. Subsequently, in step 508, an estimate is provided that is indicative of a factor related to a change in application rate due to overlapping paths through area 100 when applying the one or more formulations to the area. Note that this application factor, AppFactor, is typically between 0 and 1, wherein 1 indicates that there is no overlap between paths when applying the one or more formulations to the area 100, and as AppFactor decreases to 0, there is a greater overall lap of paths across the area 100 when applying the formulation(s). Thus, an application factor of 0.75 may be interpreted as, on the average, the paths traversing the area 100 during application of the formulation(s) overlap approximately 0.25 of the area of each path. Thus, in this case, a typical path through the area 100 may overlap adjacent paths by a strip on each side of the path, wherein each strip includes approximately 12.5% of the area of the path.

In step 512, the first formulation of substances to be applied to the area 100 is assigned to the variable, S. Note that one or more such formulations may be applied to the various management zones in the area 100. Further, note that not all such formulations need be applied to each management zone. Thus, this first formulation may be applied to one or more of the management zones for the area 100 and may not be applied to one or more other management zones of the area 100.

Subsequently, in step 516, a management zone, $MZ_S$, is selected, wherein this management zone is to have the substance formulation denoted by S applied thereto, and wherein this management zone is determined to be a baseline or reference management zone whereby the application rate for the formulation S for other management zones is determined relative to the application to management zone $MZ_S$. Subsequently, in steps 520 through 536, a determination is made of the relative amount of the formulation S to be applied to each management zone in comparison to the management zone identified by $MZ_S$. That is, once a first of the management zones is assigned to the variable MZ (step 520), the steps 524 through 536 form a loop wherein for each management zone, the user first supplies (if not previously supplied) a text description of the management zone (step 524). Then in step 528, the two-dimensionally indexed variable, ReLAmt[S, MZ], is assigned a value indicative of a relative amount of the formulation S to be applied to the currently-being-processed management zone, MZ, wherein this value is relative to the amount of the formulation S applied to the management zone $MZ_S$. Accordingly, if the relative amount (per some uniform measure of area such as acre) of the formulation S is identical to the amount to be applied (e.g., per acre) to the management zone $MZ_S$, then RelAmt[S, MZ] will be equal to 1. Alternatively, the value, RelAmt[S, MZ], may be proportionally adjusted to be less than 1 when a lesser amount of the formulation S is to be applied to the management zone MZ, and adjusted to be proportionally greater than 1 when a greater relative amount of the formulation S is to be applied to MZ. Thus, if there is to be only half as much of the formulation S to be applied to the management zone MZ, then RelAmt[S, MZ] will be 0.5. Note that it is an aspect of the present invention that as with the estimate for AppFactor determined in step 508, that these values may be determined interactively by requesting them from the user. Thus, in one embodiment of the present invention, user knowledge about the area 100 and about the method by which formulations are applied thereto may be relied upon in determining how each formulation of substances is to be applied to the various management zones of the area 100. In particular, when using the present invention in agriculture, wherein a farmer may have substantial experience with growing crops in the area 100, the present invention allows the farmer to utilize his knowledge of the area 100 to provide not only the estimate of step 508, to select a particular management zone $MZ_S$ in 516, and to enter the relative amounts of the formulation S in step 528, but the present invention also allows the farmer to modify the management zones for the area 100. Thus, the farmer (or any other user using the present invention) can utilize his/her knowledge of the area 100 to a greater extent than prior art formulation application systems.

Thus, the present invention may synergistically combine sophisticated digital image processing technology and the knowledge known by, e.g., a farmer of area 100 to determine the substance formulations and amounts to apply to the management zones of the area 100. Moreover, in some embodiments of the present invention, the user may incorporate his/her understanding of area 100 with the results from multiple image analyses of area 100, wherein images of area 100 may be taken using infrared, visible light, and/or multi and hyper spectral light reflectance and/or absorption, plus any kind and type of themed nutrient plans, yield maps and other remotely sensed data, as well as themed derived maps using any or all of the above types of data in combination.

In step 532 of FIG. 10, a determination is made as to whether there are more management zones to be processed by the loop of steps 524 through 536. If there are further management zones to be processed, then in step 536 the next management zone is assigned to the variable MZ and step 524 is a gain encountered. It is important to note that the formulation S need not be applied to each management zone. In particular, in step 528, the value of RelAmt[S, MZ] may be zero for any management zone denoted by MZ.

In steps 540 through 560, the amount of the formulation S to be applied to each management zone MZ, and the total amount of the formulation S to be applied to the area 100 are computed. In particular, after the initialization (step 540) for assigning to the variable MZ a value representing the first management zone, the steps 544 through 560 are iteratively performed, wherein step 544 computes a value, AR[S, MZ], that is indicative of an application rate of the formulation S for the management zone MZ. In particular, the baseline rate of application for the management zone $MZ_S$ (i.e., INIT_RATE[S, $MZ_S$]) is multiplied by the relative amount of the formulation S to be applied to the management zone MZ and then multiplied by the application factor, AppFactor. Subsequently, in step 548, the application rate for the formulation S to the management zone MZ is multiplied by the area for this management zone to obtain a value for the variable, AMOUNT[S, MZ], that represents the amount of the formulation S to be applied to the management zone represented by MZ. Following this, in step 552, the variable, TOTAL_AMOUNT[S], is incremented by the amount of the formulation S to be applied to the management zone represented by MZ. Subsequently, in step 556, a determination is made as to whether there are additional management zones to process via the loop of steps 544 through 560. If so, then in step 560 the next management zone is assigned to the variable MZ and the steps 544 through 556 are again performed. Alternatively, if in step 556 it is determined that there are no further management zones to process in the loop of steps 544 through 560, then step 564 is performed wherein the total amount of the formulation S is output. Note, however, that various embodiments of the step 564 may be provided so that, for example, the amount of the formulation S applied to each management zone may also be output. Additionally, any or all of the values used in determining the TOTAL_AMOUNT[S] may also be stored in a data base so that they can be referenced at some future time. In particular, storage of such values may be advantageous during application of the formulation S to the area 100 in that if a substantially greater or lesser amount of the formulation S is applied to a particular management zone, then the user can be alerted to this during the application process.

In step 568, a determination is made as to whether there are additional formulations to be applied to at least one management zone of the area 100. If so, then in step 572 the next formulation is determined and data indicative of this formulation is assigned and/or referenced by the variable S. Following this latter step, step 516 is again encountered for determining the amounts of this next formulation to be applied to the management zones of the area 100. Note that each of the formulations to be applied to the area 100 may also be determined by a user that is familiar with the area 100. In particular, for at least agricultural fields, any and/or all formulations may be determined by also incorporating the results a chemical analysis of soil samples taken throughout the area 100. Thus, by taking such samples from each of the management zones the user (e.g. farmer) may be able to combine his/her crop growing experience in the area 100 with the analytical information provided by results from such sampling analyses (and with any image analysis results as discussed hereinabove) to thereby make better decisions as to the formulations to be applied to various management zones within the area 100. In one embodiment, the results from such soil sampling may be statistically correlated with pixels colors of the aerial photo images. In this case, it may be possible to analyze a relatively small number of samples taken from locations having known latitude/longitude coordinates, and extrapolate the soil sample results across the area 100 using a statistical correlation with image pixel characteristics such as color, hue, intensity, etc.

Alternatively, if in step 568 there are no further formulations to be applied to the management zones, then the flow chart of FIGS. 10A and 10B terminates.

Note, that one or more of the values determined in steps 508, 516, and 528 may be determined by synergistically combining pixel image characteristics, soil sample measurements, user knowledge, and optionally other area 100 characteristics (e.g. elevation, expected and/or past weather measurements such as rainfall, the number of sunny days or temperature fluctuation). In particular, such information may be synergistically utilized by a properly trained artificial neural network. Moreover, the user may provide his/her knowledge to such an artificial neural network via a fuzzy logic component that is incorporated into the artificial neural network, or which pre-processes user input for obtaining appropriate neural network input values.

Figure 11A:
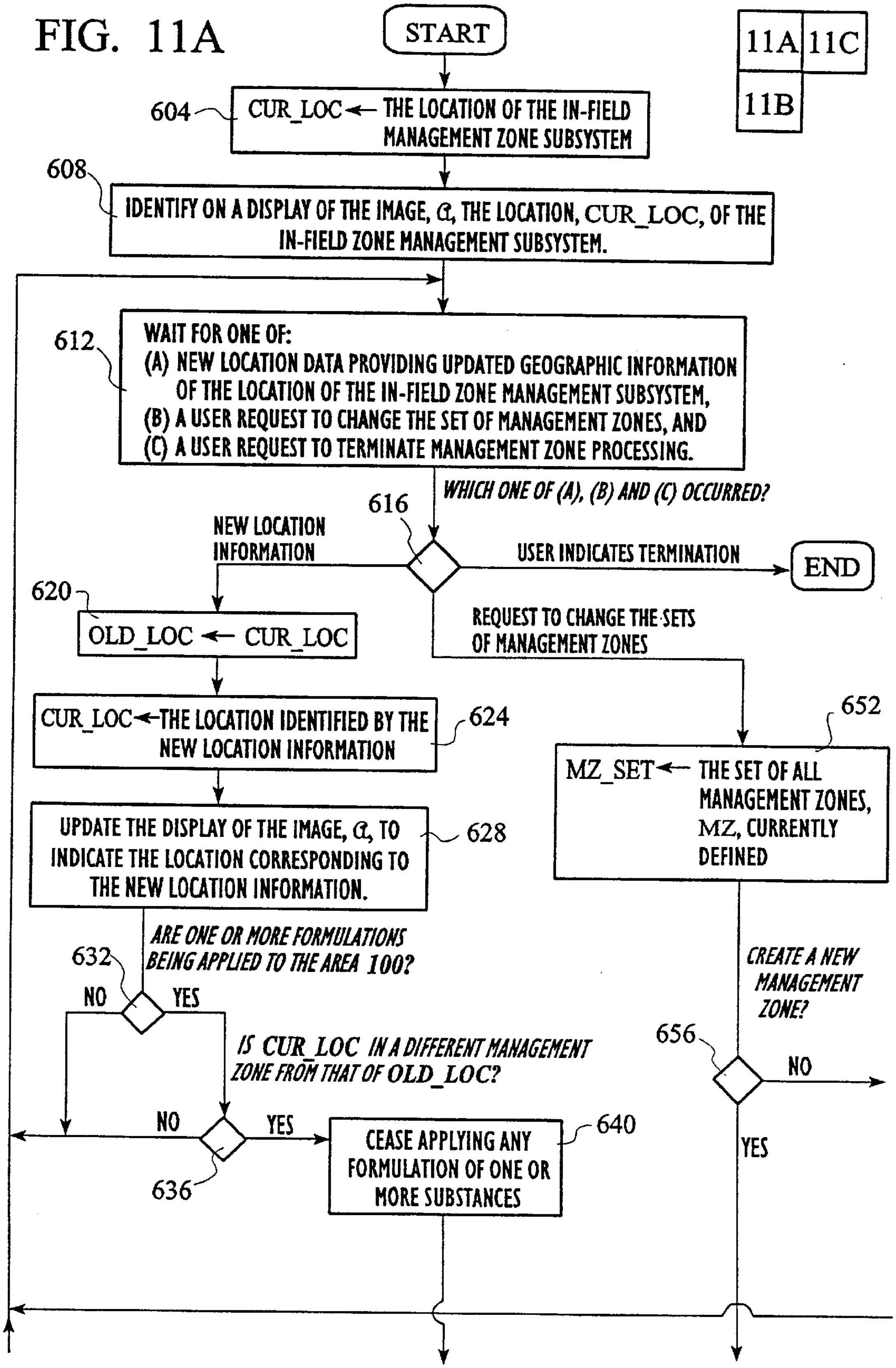
FIGS. 11A–11C illustrate a flowchart describing the steps performed by a subsystem of the present invention that is utilized in the application area (e.g., an agricultural field) having management zone representations. In particular, this flowchart illustrates the process performed by the present invention: (a) when applying different formulations of substances to different management zones, and (b) when a user changes a shape of one or more management zones.
Figure 11B:
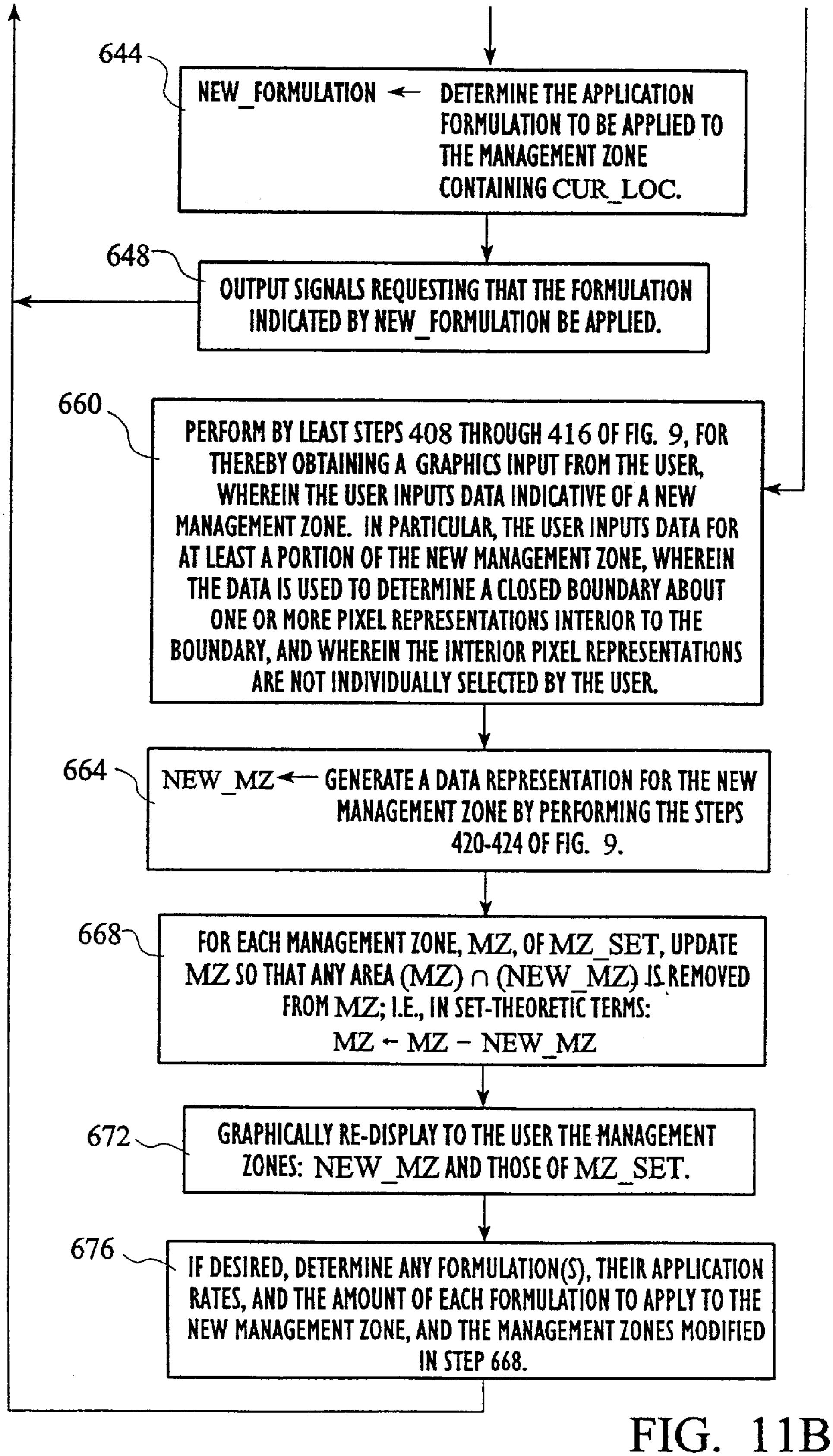
Figure 11C:
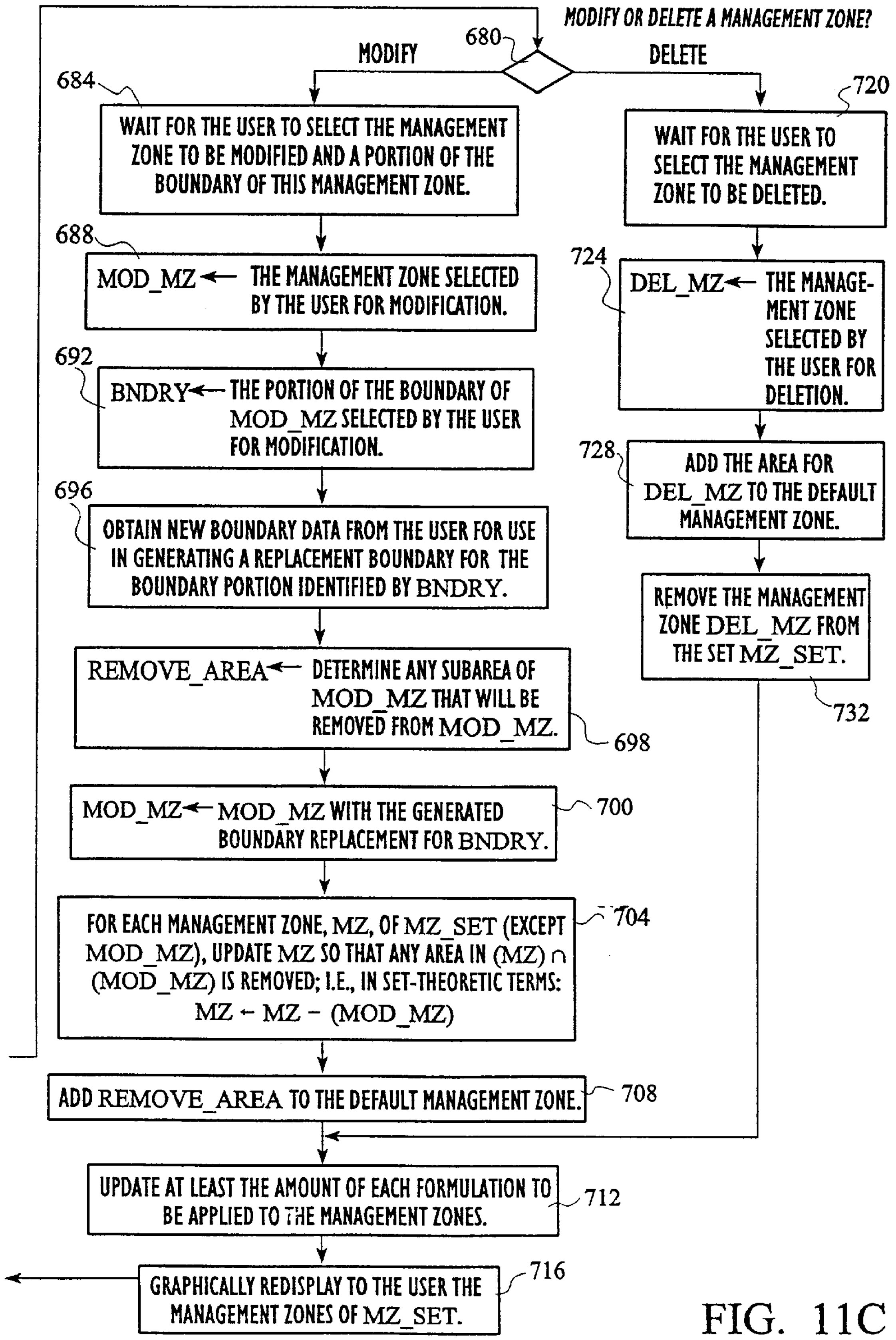

FIGS. 11A through 11C illustrate a flowchart of the processing performed when the in-field zone management subsystem is being used in the area 100.

In step 604, the variable, CUR_LOC, is provided with the location of the in-field management zone subsystem 32. In one embodiment of the present invention, this location information is received from a global positioning system (GPS) of satellites, wherein wireless signals from the satellites may be used to triangulate locations on the earth according to differences in timing signals received from at least three such satellites substantially simultaneously. Subsequently, in step 608, the location of the in-field management zone subsystem 32 is translated into a graphical representation for display on the image, $\alpha$, of the area 100. In step 612, infield management zone subsystem 32 then waits for one of the following events to occur:

(a) the receipt of new location data (from, e.g., GPS signals) used for updating the geographic location of the infield zone management subsystem 32;

(b) a user request to the in-field zone management subsystem to change a management zone; and (c) a user request to terminate management zone processing.

It is worth mentioning at this point that if new location data is received, then this location data can be used to determine if a management zone boundary has been crossed, and therefore cause the application of a different formulation of substances from the management zone in which the in-field management zone subsystem 32 was previously located. Thus, for a farmer driving a formulation application vehicle through an agricultural field, the in-field management zone subsystem 32 of the present invention is capable of outputting signals to induce a change in the formulation of substances being applied to the area 100. Further, note that in (b) above, the user request to change the set of management zones may include any one of creation, modification, and deletion of a management zone. Additionally note that in modifying any of the management zones, it may be necessary to update at least the amount of various formulations applied to the management zones to account for changes in the area sizes of various management zones.

Step 616 is encountered once an event is received in step 612 that satisfies one of the above three event classifications. Accordingly, step 616 makes a determination as to which of the three events occurred. Thus, if new location information for the in-field management zone subsystem 32 is received, then steps 620 through 648 are performed. Accordingly, in step 620, the previous location of the in-field management zone subsystem 32 stored in CUR_LOC is assigned to the variable OLD_LOC. Subsequently, in step 624, the new location is assigned to CUR_LOC. In step 628, the display of the in-field management zone subsystem 32 is updated so that the image, $\alpha$, of the area 100 has displayed thereon the new location of the in-field zone management subsystem. In step 632, a determination is made as to whether there are one or more formulations of substances currently being applied to the area 100. Accordingly, if no such formulations are currently being applied, then the flow of control loops back to wait for the next event in step 612. Alternatively, if one or more formulations of substances are being applied to the area 100, then in step 636, a determination is made as to whether the current location of the in-field management zone subsystem 32 is in a different management zone from the previous location. Note that such a determination can be made by determining, for example, whether the current location and the previous location are on the same side of each management zone boundary. Alternatively, a line segment between the previous location and the current location can be constructed, and a determination can be made as to whether any management zone boundary intersects this line segment. If no traversal of a management zone boundary is detected, then from step 636 the flow of control loops back to step 612 to wait for the next input event. Alternatively, if the crossing of a management zone boundary is detected, then in step 640 the in-field management zone subsystem 32 generates a signal that can be received by the formulation application vehicle to cease applying any current formulation to the area 100. Subsequently, in step 644, the in-field management zone subsystem 32 retrieves the application formulation to be applied to the newly entered management zone, and assigns data indicative of this application formulation to the variable, NEW_FORMULATION. Thus, in step 648, the in-field zone management subsystem 32 outputs signals requesting that the formulation indicated by NEW_FORMULATION be applied to the newly entered management zone. Then, following this step, the flow of control once again loops back to step 612 to wait for another input event.

Referring again to step 616, if it is determined in this step that the user has requested a change to the set of management zones, then step 652 is encountered wherein the variable, MZ_SET, is assigned information allowing access to the currently defined management zones. Following this, in decision step 656, a determination is made as to whether the user has requested a new management zone to be created. Accordingly, if it is determined that a new management zone is requested to be created, then steps 660 through 676 are performed. Accordingly, in step 660 the in-field zone management subsystem 32 is configured to accept graphical input from the user, wherein the user inputs are indicative of a new management zone. In particular, the input provided by the user allows one or more closed boundaries for the new management zone to be determined, wherein there are one or more pixel representations interior to the boundary of the new management zone, and wherein the interior pixel representations are not individually selected by the user in defining the new management zone. Note that in one embodiment of this step, the in-field management zone subsystem 32 includes a mouse or track ball or other input device for selecting locations on the graphics display of the subsystem 32 so that by using such an input device, the user can identify points that determine at least a portion of the new management zone boundary. Further, note that additional portions of such a boundary can be automatically supplied if such additional portions are coincident with, e.g., an outer perimeter for the area 100. In particular, by providing the user with the ability to snap to area 100 perimeter points, a user may only be required to identify the portion of the boundary for the new management zone that is interior to the area 100. Additionally, note that there are numerous computational techniques that are within the scope of the present invention for computing portions of boundary from user inputs. In one embodiment, the user may simply select a set of sequential vertices through which the boundary is to extend and line segments are automatically determined between the sequential boundary points selected for completing the boundary therebetween. Alternatively, various computational geometry techniques and algorithms may be used to compute boundary portions for the new management zone. In particular, various curve-fitting techniques may be used such as those used to compute polynomial interpolation functions, Bezier curves, b-spline curves, and non-uniform rational b-spline curves. However, regardless of the boundary determining technique, it is an aspect of at least one embodiment of the present invention that the user is able to define the new management zone without individually being required to identify each pixel that represents the new management zone. More particularly, it is an aspect of the present invention that the user need supply no more than a simple graphical selection of a single point that represents a location desired to be in the interior of the new management zone.

Subsequently, in step 664, a data representation for the new management zone is generated. Note that this data representation may be generated by performing the steps of 420 through 424 of FIG. 9 in one embodiment of the invention. Subsequently, in step 668, for each management zone data representation MZ in the collection, MZ_SET, this step determines whether the management zone MZ needs to be updated in that a portion of this management zone may now be included within the new management zone represented by NEW_MZ. In one embodiment of this step, a determination is first made as to whether the new management zone is wholly contained within a current management zone. If this is true, then only the management zone wholly containing the new management zone must be updated. Alternatively, since each management zone is presumed to have a set of one or more simple closed curves as its boundary, if the new management zone is not wholly contained within an existing management zone, then the boundary of the new management zone must intersect the boundary of one of the existing management zones, and each such management zone must be updated to reflect the removal of a portion of its area that has become part of the new management zone. Thus, by iteratively intersecting the boundary of the new management zone with the boundary of each of the management zones in the collection represented by MZ_SET, a determination can be made as to which of the management zones require their areas to be updated. Subsequently, for the one or more intersection points between the new management zone NEW_MZ and a management zone of MZ_SET, the boundary portion therebetween for the new management zone may be substituted for the previous boundary of the management zone in MZ_SET.

After all such management zones have had their boundaries appropriately updated, in step 672, the new management zone configurations are displayed to the user. Note, however, that although not illustrated in the accompanying figures, it is also an aspect of the present invention that the user may activate an undo operation which can delete the new management zone(s) and return the management zones represented by MZ_SET to their configuration prior to step 668.

Subsequently, in step 676 if desired, the user may determine and input any formulations to be applied to the new management zone, the application rates of these formulations and/or the amount of each formulation to apply to the new management zone. Additionally, the amount of each formulation applied to each previously existing but modified management zone may be recomputed. Following this step 676, the flow of control for the present flowchart returns to step 612 to await another input event for processing.

Returning now to step 656, if it is determined in this step that the user does not wish to create a new management zone, then decision step 680 is encountered wherein a determination is made as to whether the user wishes to modify or delete a currently existing management zone. Accordingly, steps 684 through 712 are performed when the user indicates that a management zone is to be modified. In step 684, the present invention waits for the user to select the management zone to be modified and a portion of the boundary of this management zone which is to be changed to reflect the desired modifications. Subsequently, in steps 688 and 692, the variables MOD_MZ and BNDRY are assigned values indicative of the management zone selected by the user for modification, and the portion of the boundary of this management zone that is selected for modification, respectively. As an aside, note that there are various user interaction techniques for selecting both the management zone to be modified and the portion of the boundary of this management zone. In one embodiment, the management zone can be selected by merely identifying a graphical location within the management zone. Additionally, regarding the selection of the boundary portion of the management zone for modification, two pixels may be identified by the user on the boundary and the boundary therebetween can be highlighted to indicate to the user the portion of the boundary that has been selected to be changed. Note that in this latter technique, the sequence within which the two points on the boundary are selected by the user may determine which of the two portions of a simple closed boundary curve is to be selected for modification (i.e., considered "between" the two user identified boundary points).

In step 696, new boundary data is obtained from the user for generating the portion of the boundary identified by the variable, BNDRY. Note that the user interaction techniques for obtaining the new boundary data may be substantially identical to the user interaction techniques for creating a new management zone as described hereinabove. In step 698, the (any) subarea of the management zone being modified that is to be removed from this management zone has its data representation assigned to (or referenced via) the variable, REMOVE_AREA. Note that REMOVE_AREA may represent a plurality of subareas disconnected from one another, wherein each subarea is bounded by one of more closed curves.

Figure 12:
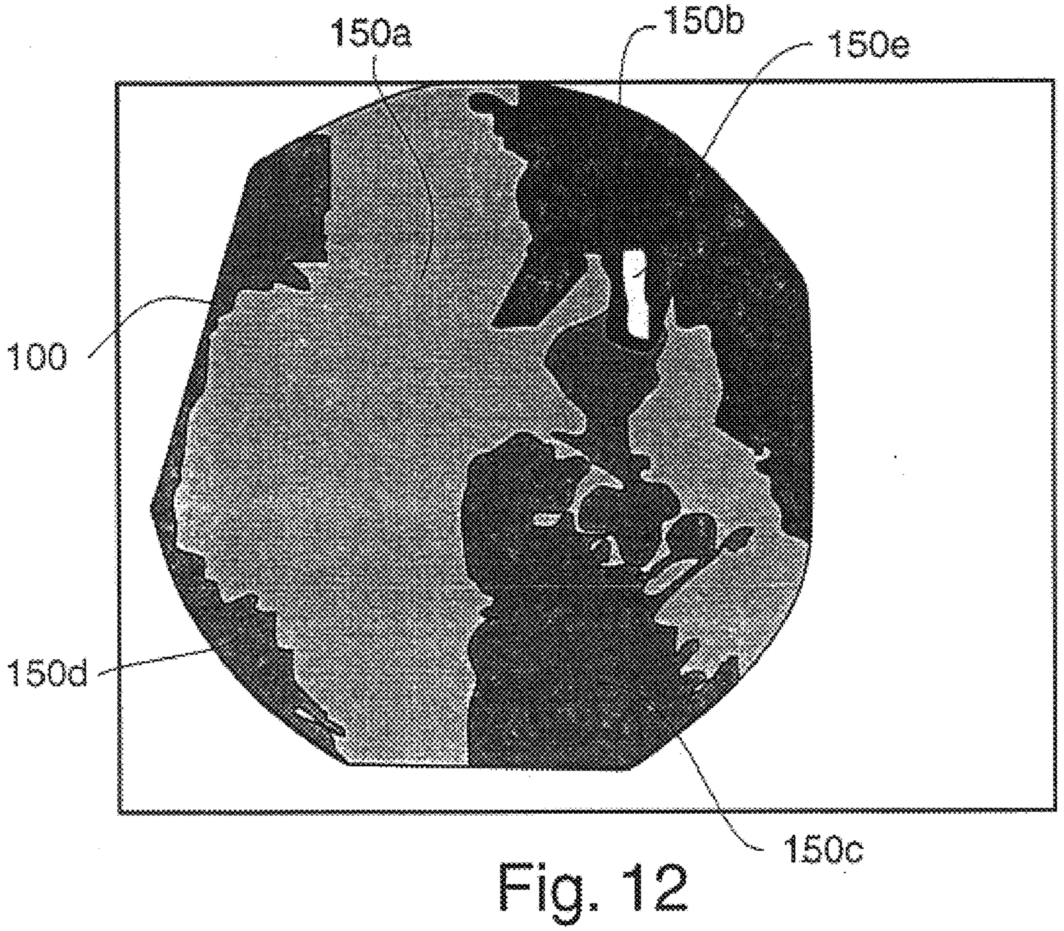
FIG. 12 is an illustration of a graphical representation of area 100, where the management zones shown in FIG. 7 have been modified.

FIG. 12 shows an example of a newly created management zone 150*e* and modified management zone 150*b* of FIG. 7, wherein the management zone 150*b* now includes part of the default management zone 150*a*, and the management zone 150*c*. Additionally, a portion of management zone 150*b* has been relinquished to the default management zone and the new management zone 150*e*. Note that that boundary for the management zone 150*b* now includes two distinct closed curves.

Subsequently, in step 700, the management zone identified by the variable, MOD_MZ, is regenerated with the new boundary portion. In step 704, any updates to other management zones to account for any increase in area size of the modified management zone that may now overlap with these other management zones is performed. That is, any such overlap must be removed from the other management zones. Subsequently, in step 708, the (any) area represented by the variable, REMOVE_AREA, that was removed from the modified management zone is now added to the default management zone. In step 712, the formulation amount supplied to each of the management zones is updated to account for the changes in area sizes of the management zones. In step 716, the management zones are graphically redisplayed to the user to reflect all management zone changes performed during the management zone modification process.

Returning now to step 680 again, if the user has indicated that a management zone should be deleted, then the steps 720 through 732, and steps 712 and 716 are performed. Accordingly, in step 720, the present invention waits for the user to select-the management zone to be deleted. Following this, steps 724 and 728, the management zone selected is assigned to (or referenced by) the variable, DEL_MZ, and subsequently the area for this management zone is added to the default management zone. Consequently, in step 732, the management zone to be deleted is removed from the set of management zones, MZ_SET. Finally, steps 712 and 716 are performed wherein, as before, the amount of each formulation to be applied to the area 100 is updated according to the size of the management zones, and the newly configured management zones with the deleted management zone removed are displayed. Note that once step 716 graphically displays the new set of management zones, the flow of control for the present program once again loops back to step 612 and waits for the next input event.

FIG. 12 shows an example of a modified management zone 150*b* from that of FIG. 7 wherein the management zone 150*b* now includes part of the default management zone 150*a*, and the management zone 150*c*. Additionally, a portion of management zone 150*b* has been relinquished to the default management zone, and to the new management zone 150*e*. Note the boundary for the management zone 150*b* now includes two distinct closed curves.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for applying one or more substances to a geographical area, comprising:

obtaining a visual representation of said geographical area;

associating with a first representation of a first subarea of said visual representation, first information for applying a mixture of said one or more substances to said first subarea;

presenting an image of said visual representation to a person, wherein said image distinguishes a presentation of said first representation from at least one other portion of said image;

receiving input from the person, wherein said input is indicative of an area change in said first subarea, wherein (a) through (c) following:

(a) said input includes a representation of one or more geographic locations for at least part of a perimeter for said area change, (b) said input does not include an identification of at least one pixel representing an interior to said area change, and (c) at least a portion of said area change does not have said first information associated therewith for applying said mixture of said one or more substances to said portion;

generating, using said input, a second representation of a modified version of said first subarea, said modified version including said first subarea and said area change, wherein said first information is associated with said second representation;

accessing said second representation and said first information for applying said one or more substances to said modified version of said first subarea according to said mixture.

2. The method of claim 1, further including a step of second accessing second information associated with applying in a second way, different from said first way, said one or more substances to a second subarea of said geographical area outside of said modified version of said first subarea;

wherein a difference of said second way from said first way is dependent on a difference of said second information from said first information.

3. The method of claim 2, wherein said difference includes at least one of a different formulation and a different application rate of said substances.

4. The method of claim 1, wherein said area change includes an area that is exterior to said first subarea.

5. The method of claim 1, wherein said visual representation includes a plurality of visually distinct representations of a plurality of subareas of said georgraphical area, said first subarea being one of said subareas.

6. The method of claim 1, wherein prior to said step of generating, said at least a portion of said area change had associated therewith second information indicative of an application of said substances to said at least a portion that is different from said mixture to said first subarea.

* * * * *